United States Patent [19]

Aoki et al.

[11] Patent Number: 5,356,491
[45] Date of Patent: Oct. 18, 1994

[54] COMPOSITION AND METHOD FOR TREATING TIN PLATED STEEL SURFACE

[75] Inventors: Tomoyuki Aoki, Chigasaki; Masayuki Yoshida, Yokohama, both of Japan

[73] Assignee: Henkel Corporation, Plymouth Meeting, Pa.

[21] Appl. No.: 64,085

[22] PCT Filed: Nov. 14, 1991

[86] PCT No.: PCT/US91/08405

§ 371 Date: May 21, 1993

§ 102(e) Date: May 21, 1993

[30] Foreign Application Priority Data

Nov. 21, 1990 [JP] Japan ................. 2-317017

[51] Int. Cl.$^5$ ............................................. C23C 22/07
[52] U.S. Cl. ................... 148/253; 148/251; 148/259; 148/260; 106/14.12; 427/388.4
[58] Field of Search .......... 106/14.12; 427/372.2, 427/388.4; 148/253, 251, 259, 260; 524/543, 547, 551, 555

[56] References Cited

U.S. PATENT DOCUMENTS

| | | | |
|---|---|---|---|
| 4,018,701 | 4/1977 | Ralston et al. | 252/389 |
| 4,264,378 | 4/1981 | Oppen et al. | 148/261 |
| 4,409,121 | 10/1983 | Latos et al. | 106/14.12 |
| 4,433,015 | 2/1984 | Lindert | 148/251 |
| 4,437,898 | 3/1984 | Drosdziok et al. | 106/14.12 |
| 4,517,028 | 5/1985 | Lindert | 148/251 |
| 4,927,472 | 5/1990 | Matsushima et al. | 148/261 |

FOREIGN PATENT DOCUMENTS

| | | |
|---|---|---|
| 0015020 | 9/1980 | European Pat. Off. . |
| 0091166 | 10/1983 | European Pat. Off. . |
| 0312176 | 4/1989 | European Pat. Off. . |
| 3407513 | 9/1985 | Fed. Rep. of Germany ... 106/14.12 |
| 53-019345 | 2/1978 | Japan .................. 106/14.12 |
| 64-85292 | 3/1989 | Japan . |
| 01100281 | 4/1989 | Japan . |
| 01172406 | 7/1989 | Japan . |
| 0450272 | 2/1992 | Japan . |
| 9110756 | 7/1991 | PCT Int'l Appl. . |

*Primary Examiner*—Anthony Green
*Attorney, Agent, or Firm*—Ernest G. Szoke; Wayne C. Jaeschke; Norvell E. Wisdom, Jr.

[57] ABSTRACT

A superior protective prepainting treatment for tin plated steel surfaces, particularly DI cans, may be achieved by contacting the surface with an aqueous liquid composition containing from 1 to 30 g/L of phosphate ions, from 0.1 to 5 g/L of condensed phosphate ions, from 0.5 to 5 g/L of reducing agent, and from 0.1 to 20 g/L of dissolved solids of a water soluble aminated poly{vinyl phenol} resin.

20 Claims, No Drawings

COMPOSITION AND METHOD FOR TREATING TIN PLATED STEEL SURFACE

TECHNICAL FIELD

The present invention relates to a liquid composition and process for treating a surface of tin-plated steel, particularly the surface of drawn and ironed (hereinafter "DI") tin cans. The process imparts an excellent corrosion resistance and paint adherence to the surface of such a can after its formation by the draw-ironing of tin-plated steel sheet but before its painting or printing. The process and composition also impart the excellent slideability which is required for the smooth conveyor transport of such a can (designated briefly below as simply "slideability")

BACKGROUND ART

In the field of liquid compositions for treating the surface of tin-plated DI can, one example of related art is the invention disclosed in (1) Japanese Patent Application Laid Open [Kokai or Unexamined] Number 01-100,281 [100,281/89] by the assignee of the present applicants. This particular invention comprises a film-forming liquid composition for the treatment of metal surfaces in which the liquid composition has a pH of 2 to 6 and contains 1 to 50 g/L phosphate ion, 0.2 to 20.0 g/L oxyacid ion, 0.01 to 5.0 g/L tin ion, and 0.01 to 5.0 g/L condensed phosphate ion. Treatment with this liquid composition lays down a strongly corrosion-resistant phosphate film on the surface of tin-plated DI can.

In addition, the invention disclosed in (2) Japanese Patent Application Laid Open Number 01-172,406 [172,406/89] is an example of a treatment method intended to develop corrosion resistance and adherence through the use of water soluble resin. This invention comprises a method for treating metal surfaces with a solution which contains a derivative of a suitable polyhydric phenol compound.

Furthermore, during the metal can manufacturing process, the high friction coefficient of the exterior can surface causes the can surface to have a poor slideability during conveyor transport of the can, which often causes the can to tumble over sideways and thus impairs the transport operation. Can transportability is a particular issue with respect to transport to a printer. It is therefore necessary in the can-manufacturing industry to reduce the static friction coefficient of the exterior can surface without compromising the adherence of any paint or lacquer to be coated on the can. The invention disclosed in (3) Japanese Patent Application Laid Open Number 64-85292 [85,292/89] is an example of a method for improving the slideability. This invention concerns an agent for treating the surfaces of metal cans. This particular agent contains water soluble organic material selected from phosphate esters, alcohols, monovalent and polyvalent fatty acids, fatty acid derivatives, and mixtures of the preceding.

It has already been discovered that a film with an excellent corrosion resistance, excellent paint adherence, and improved slideability can be formed on the can surface through the use of a surface treatment liquid composition which characteristically comprises an aqueous solution with a pH of 2.0 to 6.5 which contains 1 to 30 g/L of phosphate ions, 0.1 to 5 g/L of condensed phosphate ions, and 0.1 to 20 g/L (as solids) of a water soluble resin (poly{vinyl-phenol-amino} compound). This has been the subject of an antecedent patent application (Japanese Patent Application Number 02-160,443 [160,443/90]).

DESCRIPTION OF THE INVENTION

Problem to Be Solved by the Invention

The invention in the above described related art example (1) consists of a method for the formation of a phosphate film on the surface of DI tin cans. The tin-plated DI can produced over the last few years has carried smaller quantities of tin plating in response to economic pressures, and this has necessitated surface treatments with a far better corrosion resistance than before. However, the required substantial improvement in corrosion resistance lies beyond the capacity of the phosphate film formed in the above-described art example (1).

The invention in the above described art example (2) involves the use of a polyhydric phenol compound. However, a satisfactorily stable performance (corrosion resistance) is not always obtained by treating tin-plated DI can by this method.

The invention in the above described art example (3) does in fact improve the slideability to some degree, but it does not improve the corrosion resistance or paint adherence of tin-plated DI cans.

Finally, in the case of the invention of the antecedent application, the resin is precipitated by the eluting tin ion when tin-plated DI can is continuously treated, and this impairs the industrial utility of this method.

Thus, with respect to the treatment of tin-plated DI cans, there is demand in the art for a treatment liquid composition (a) which generates a film which simultaneously provides an excellent corrosion resistance, paint adherence, and slideability and (b) which itself presents excellent process characteristics, capable of supporting continuous treatment. However, relative to this property spectrum both the above-described related art examples and the invention of the antecedent application suffer from problems which would be advantageous to solve.

SUMMARY OF THE INVENTION

As a concrete means for solving the aforementioned problems which arise in the above-described art examples and with the invention of the antecedent application, the present invention proposes a liquid composition for treating the surface of tin-plated DI can, where said liquid composition characteristically has a pH of 2.0 to 6.5 and comprises, preferably consists essentially of, or more preferably consists of, water and 1 to 30 grams per liter (hereinafter "g/L") of phosphate ions, 0.1 to 5 g/L of condensed phosphate ions, 0.5 to 5 g/L of reducing agent, and 0.1 to 20 g/L (as solids) of water-soluble resin with the following general formula:

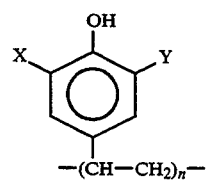

where, in the preceding formula, n is an integer with a value in the range from 2 to 80 for individual molecules in the resin but may have a non-integral average value for the resin component as a whole; each of X and Y independently of each other and independently for each unit in the molecule may represent hydrogen or a group "Z" with the following formula:

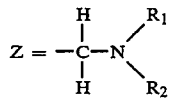

in which each of $R_1$ and $R_2$ independently of each other and independently for each Z group in the component represents a $C_1$ to $C_{10}$ alkyl and/or hydroxyalkyl moiety; and the total number of Z groups present in the resin component is from 30 to 200% of the total number of aromatic rings in the resin component.

This liquid composition for treating the surface of tin-plated DI can has excellent process characteristics which make possible continuous treatment and also generates a film which simultaneously provides an excellent corrosion resistance, paint adherence, and slideability.

DETAILS OF PREFERRED EMBODIMENTS OF THE INVENTION

The surface-treatment liquid composition according to the present invention comprises an acidic treatment liquid composition whose essential components are phosphate ion, condensed phosphate ion, reducing agent, and water soluble resin.

The phosphate ions can be introduced into the treatment liquid composition using phosphoric acid ($H_3PO_4$), sodium phosphate ($Na_3PO_4$), and the like. Their content should fall within the range preferably of 1 to 30 g/L and more preferably of 5 to 15 g/L. At phosphate ion concentrations below 1 g/L, the reactivity is poor and film formation will not usually be satisfactory. While a good-quality film can be formed at values in excess of 30 g/L, the cost of the liquid composition is increased and the economic value is impaired.

The condensed phosphate ions comprise at least one selection from pyrophosphate ions, tripolyphosphate ions, and tetrapolyphosphate ions. An acid and/or salt can be used to introduce the condensed phosphate ion. For example, when the pyrophosphate ion is to be introduced, pyrophosphoric acid ($H_4P_2O_7$), sodium pyrophosphate ($Na_4P_2O_7$), and the like can be used. This component should preferably be present at 0.1 to 5 g/L, and the range of 0.4 to 1 g/L is particularly preferred. At values less than 0.1 g/L, a satisfactory film will not normally be formed, due to the weak etching activity. However, the etching activity is too high at values in excess of 5 g/L, and the film forming reaction is usually inhibited.

The reducing agent is not specifically restricted, but it preferably consists of phosphorous acid and/or hypophosphorous acid and/or their salts. While its content will be governed by the reducing power of the particular reducing agent, the general range of 0.5 to 5 g/L is preferred. At concentrations less than 0.5 g/L, a satisfactory effect is often not developed by this component due to the weak reducing activity. The cost of the treatment liquid composition is increased and the economics become problematic at reducing agent concentrations in excess of 5 g/L. As an example, the acid or salt can be used to introduce phosphorous acid or hypophosphorous acid, and their preferred addition is 1 to 3 g/L, measured as the stoichiometric equivalent as acid.

The water soluble resin used by the present invention has the following general formula:

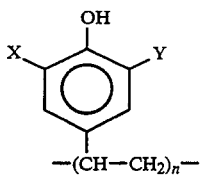

in which n has a value of 2 to 80. The molecular weight is too low at values of n below 2 and no improvement in corrosion resistance for the treated tin plate will normally be observed. At values of $n=81$ and above, the aqueous solution has a reduced stability which will normally generate problems in practical use.

The groups $R_1$ and $R_2$ in the general formula for the groups Z already given above are $C_1$ to $C_{10}$ alkyl and/or hydroxyalkyl groups. Functional groups containing 11 or more carbons reduce the stability of the aqueous solution. The group Z is preferably $-CH_2N(CH_3)CH_2CH_2OH$ or $-CH_2N(CH_3)_2$.

The number of groups Z should be 30 to 200% of the number of aromatic rings in the above-described resin polymer. Thus, when five Z groups are present in a polymer with $n=10$, the ratio of Z's to aromatic rings is then 50%. Ratios below 30% cause the resin to be poorly water soluble and thus risk stability problems. (Ratios higher than 200% would be inconsistent with the general formula for the resin.)

The specified water soluble resin should be present at 0.1 to 20 g/L on a solids basis. Resin concentrations less than 0.1 g/L make stable film formation on the can surface highly problematic. Concentrations in excess of 20 g/L are uneconomical due to the increased cost of the treatment solution.

The pH of the treatment liquid composition must be in the range from 2.0 to 6.5. Etching is heavy and film formation is impaired at pH values less than 2.0. At pH values in excess of 6.5, the liquid composition life is shortened because the resin tends to precipitate and sediment. The pH can be adjusted as needed through the use of an acid, for example, phosphoric acid, nitric acid, hydrochloric acid, hydrofluoric acid, or the like, or through the use of a base, for example, sodium hydroxide, sodium carbonate, ammonium hydroxide, or the like.

The method for preparing the surface-treatment liquid composition according to the present invention can be briefly explained as follows. Prescribed quantities of phosphate ions, condensed phosphate ions, and reducing agent as described above are dissolved in water with thorough stirring. When the pH of this liquid composition is not already less than 7, it is adjusted to below 7 using the appropriate acid as listed above. The water soluble resin specified by the present invention is then added and completely dissolved while stirring, and the pH is adjusted as discussed above if not already within the desired range.

The film which is formed by contact of the surface treatment liquid composition of the present invention with tin plate is an organic/inorganic composite film which is composed of the resin and phosphate salts, with the main component of the phosphate salts being tin phosphate. The substrate is etched by the phosphate ion and condensed phosphate ion, the pH at this time is locally increased at the interface, and phosphate salt is deposited on the surface. Moreover, the amino groups in the resin have a chelating activity, and probably form a coordination compound with the fresh surface of the substrate generated by etching. The organic/inorganic composite film is formed by essentially these two mechanisms. The simultaneous presence of the condensed phosphate ion probably promotes formation of the resin/metal coordination compound, and this would facilitate the stable formation of the organic/inorganic composite film on the surface over a broad pH range.

The process for treating tin-plated DI can using the surface-treatment liquid composition of the present invention will now be considered. The treatment liquid composition can be applied by any method that achieves adequate contact between the liquid composition and the metal surface to be treated for an adequate time. The following process steps constitute a preferred example of a suitable process according to this invention.

1. Surface cleaning of the tin-plated DI can: degreasing (a weakly alkaline cleaner is typically used)
2. Tap water rinse
3. Film-formation treatment (application of the treatment liquid composition according to the present invention)
   treatment temperature: ambient to 80° C.
   treatment method: spray
   treatment time: 2 to 60 seconds
4. Tap water rinse
5. Rinse with de-ionized water
6. Drying A surface treatment liquid composition according to the present invention can be used at treatment temperatures from room temperature (i.e., about 20° C.) up to 80° C.; however, it is preferably used generally heated to 40° to 60° C. The contact time should be 2 to 60 seconds. At less than 2 seconds, the reaction is generally inadequate and a highly corrosion resistant film will not be formed. No improvement in performance is observed for treatment times in excess of 60 seconds. Accordingly, the most useful treatment times will fall in the range of 2 to 60 seconds. Contact is preferably by spraying, at least on objects such as tin cans with only one surface plated, in order to avoid waste of treatment materials by unnecessarily treating the unplated side, as would result from immersion contact.

The superior utility of the surface-treatment liquid composition according to the present invention will be illustrated in the following through the use of examples and comparison examples.

EXAMPLES AND COMPARISON EXAMPLES

General Test Methods and Procedures

The corrosion resistance of treated cans was evaluated using the iron exposure value ("IEV"), and the IEV was measured in accordance with the invention of U.S. Pat. No. 4,332,646. The corrosion resistance is better at lower IEV values, and a score below 150 is generally regarded as excellent.

The paint adherence was evaluated based on the peel strength as follows: The surface of the treated can was coated with an epoxy/urea can paint to a film thickness of 5 to 7 micrometers; this was baked at 215° C. for 4 minutes; the can was then cut into a 5×150 mm strip; a test specimen was prepared by hot-press adhesion with polyamide film; and this was peeled by the 180° peel test method. Accordingly, the paint adherence increases as the peel strength increases, and values in excess of 1.5 kgf/5 mm-width are generally regarded as excellent.

The slideability was evaluated by measuring the static friction coefficient of the exterior surface of the can. Thus, the slideability improves as the static friction coefficient declines, and values below 1.0 are generally regarded as excellent.

Finally, the stability of the compositions was evaluated as follows. First, tin-plated DI can (manufactured by the DI-processing of tin-plated steel sheet) was degreased using a 1% hot aqueous solution of a weakly alkaline degreaser (FINECLEANER TM 4361A, commercially supplied by Nihon Parkerizing Company, Ltd.). One immersion cycle consisted of immersing the degreased can for 2 minutes in 1 L of the particular surface treatment liquid composition heated to 60° C. After 10 cycles, the surface treatment liquid composition was inspected for resin precipitation. The stability was considered to be excellent when resin precipitation was absent.

Example 1

Tin plated DI can was prepared by draw-ironing tin plated steel sheet. It was cleaned with a 1% hot aqueous solution of a weakly alkaline degreaser (FINE-CLEANER TM 4361A, registered brand name of Nihon Parkerizing Company, Ltd.), then sprayed with surface-treatment liquid composition 1, heated to 60° C., for 30 seconds, then washed with tap water, sprayed with de-ionized water (with a specific electrical resistance of at least 3,000,000 ohm-cm) for 10 seconds, and, finally, dried in a hot air-drying oven at 180° C. for 3 minutes. This treated can was subjected to an evaluation of the corrosion resistance, adherence, and slideability, and the stability of surface-treatment liquid composition 1 was also evaluated.

Surface-Treatment Liquid Composition 1

75% phosphoric acid ($H_3PO_4$)
   10.0 g/L (providing 7.2 g/L of $PO_4^{3-}$ ions)
sodium pyrophosphate ($Na_4P_2O_7.10H_2O$)
   1.0 g/L (providing 0.4 g/L of $P_2O_7^{4-}$ ions)
phosphorous acid ($H_3PO_3$)
   2.0 g/L (providing 1.9 g/L of $PO_3^{3-}$ ions)
resin solids
   2.0 g/L of water soluble resin 1 (see below)
pH=4.0 (adjusted with sodium hydroxide)
water soluble resin 1 had, in the general formula given above, an average value for n of 40, half the total of X's and Y's in the general formula as Z, and Z was —$CH_2N(CH_3)CH_2CH_2OH$.

Water soluble resin 1 was synthesized as follows. 100 g of propylene glycol monopropyl ether (a CELLOSOLVE TM solvent) was introduced into a 1,000 mL reaction flask equipped with a condenser, nitrogen inlet tube, overhead stirrer, and thermometer, and 60 g of poly-4-vinylphenol (average molecular weight=5,000) was added and dissolved. 40 g of 2-methylaminoethanol and 100 g of deionized water were added, and this was reacted by heating to 50° C. 40 g of 37% aqueous formaldehyde solution was added over 1 hour, followed by stirring at 50° C. for 2 hours and by stirring for an additional 3 hours at 80° C. The reaction product was cooled, 15 g of 85% orthophosphoric acid was added, and 700 g deionized water was also added. The resin was then precipitated by the addition of 10% sodium hydroxide solution until the pH of the reaction solution reached 8 to 9. The precipitated resin was filtered off, washed with water, and dried.

Example 2

Tin-plated DI can was cleaned using the same conditions as in Example 1 and was then treated with a 30 second spray of surface treatment liquid composition 2 heated to 60° C. This treatment was followed with a water rinse and drying using the same conditions as in Example 1. The treated can was subjected to an evaluation of the corrosion resistance, adherence, and slideability, and the stability of surface treatment liquid composition 2 was also evaluated.

Surface-Treatment Liquid Composition 2

75% phosphoric acid ($H_3PO_4$)
  10.0 g/L (providing 7.2 g/L of $PO_4^{3-}$ ions)
sodium pyrophosphate ($Na_4P_2O_7.10H_2O$)
  1.0 g/L (providing 0.4 g/L of $P_2O_7^{4-}$ ions)
hypophosphorous acid ($H_3PO_2$)
  2.0 g/L (providing 1.9 g/L of $PO_2^{3-}$ ions)
resin solids
  0.4 g/L
pH=5.0 (adjusted with sodium carbonate)
The water soluble resin was the same as in Example 1.

Example 3

Tin-plated DI can was cleaned using the same conditions as in Example 1 and was then treated with a 30 second spray of surface-treatment liquid composition 3 heated to 60° C. This treatment was followed with a water rinse and drying using the same conditions as in Example 1. This treated can was subjected to an evaluation of the corrosion resistance, adherence, and slideability, and the stability of surface treatment liquid composition 3 was also evaluated.

Surface-Treatment Liquid Composition 3

75% phosphoric acid ($H_3PO_4$)
  20.0 g/L (providing 14.4 g/L of $PO_4^{3-}$ ions)
sodium pyrophosphate ($Na_4P_2O_7.10H_2O$)
  1.0 g/L (providing 0.4 g/L of $P_2O_7^{4-}$ ions)
phosphorous acid ($H_3PO_3$)
  1.0 g/L (providing 0.96 g/L of $PO_3^{3-}$ ions)
hypophosphorous acid ($H_3PO_2$)
  1.0 g/L (providing 0.95 g/L of $PO_2^{3-}$ ions)
resin solids
  8.0 g/L
pH=4.0 (adjusted with sodium hydroxide)
The water soluble resin was the same as in Example 1.

Example 4

Tin-plated DI can was cleaned using the same conditions as in Example 1 and was then treated with a 30 second spray of surface treatment liquid composition 4 heated to 60° C. This treatment was followed with a water rinse and drying using the same conditions as in Example 1. This treated can was subjected to an evaluation of the corrosion resistance, adherence, and slideability, and the stability of surface-treatment liquid composition 4 was also evaluated.

Surface-Treatment Liquid Composition 4

75% phosphoric acid ($H_3PO_4$)
  15.0 g/L (providing 10.9 g/: of $PO_4^{3-}$ ions)
sodium pyrophosphate ($Na_4P_2O_7.10H_2O$)
  2.5 g/L (providing 1.0 g/L of $P_2O_7^{4-}$ ions)
phosphorous acid ($H_3PO_3$)
  1.0 g/L (providing 0.95 g/L of $PO_3^{3-}$ ions)
resin solids
  4.0 g/L
pH=3.0 (adjusted with sodium carbonate)
The water soluble resin was the same as in Example 1.

Example 5

Tin-plated DI can was cleaned using the same conditions as in Example 1 and was then treated with a 30 second spray of surface-treatment liquid composition 5 heated to 60° C. This treatment was followed with a water rinse and drying using the same conditions as in Example 1. This treated can was subjected to an evaluation of the corrosion resistance, adherence, and slideability, and the stability of surface-treatment liquid composition 5 was also evaluated.

Surface-Treatment Liquid Composition 5

75% phosphoric acid ($H_3PO_4$)
  30.0 g/L (providing 21.6 g/L of $PO_4^{3-}$ ions)
sodium tripolyphosphate ($Na_5P_3O_{10}$)
  0.6 g/L (providing 0.4 g/L of $P_3O_{10}^{5-}$ ions)
phosphorous acid ($H_3PO_3$)
  3.0 g/L (providing 2.9 g/L of $PO_3^{3-}$: ions)
resin solids
  2.0 g/L
pH=3.5 (adjusted with sodium hydroxide)
The water soluble resin was the same as in Example 1.

Example 6

Tin-plated DI can was cleaned using the same conditions as in Example 1 and was then treated with a 15-second spray of surface-treatment liquid composition 6 heated to 60° C. This treatment was followed with a water rinse and drying using the same conditions as in Example 1. This treated can was subjected to an evaluation of the corrosion resistance, adherence, and slideability, and the stability of surface-treatment liquid composition 6 was also evaluated.

Surface-Treatment Liquid Composition 6

75% phosphoric acid ($H_3PO_4$)
  10.0 g/L (providing 7.2 g/L of $PO_4^{3-}$ ions)
sodium pyrophosphate ($Na_4P_2O_7.10H_2O$)
  1.0 g/L (providing 0.4 g.L of $P_2O_7^{4-}$ ions)
hypophosphorous acid ($H_3PO_2$)
  2.0 g/L (providing 1.9 g/L of $PO_2^{3-}$ ions)
resin solids
  2.0 g/L of water soluble resin 2
pH=4.0 (adjusted with sodium hydroxide)
Water soluble resin 2 was the same as water soluble resin 1, except that only one-quarter rather than one-half of the X's and Y's in the general formula were Z groups. Water soluble resin 2 was synthesized as for water soluble resin 1 but with 60 g of poly-4-vinylphenol, 20 g of 2-methylaminoethanol, and 20 g of 37% formaldehyde solution.

Example 7

Tin-plated DI can was cleaned using the same conditions as in Example 1 and was then treated with a 30 second spray of surface treatment liquid composition 7 heated to 50° C. This treatment was followed with a water rinse and drying using the same conditions as in Example 1. This treated can was subjected to an evaluation of the corrosion resistance, adherence, and slideability, and the stability of surface-treatment liquid composition 7 was also evaluated.

Surface-Treatment Liquid Composition 7

75% phosphoric acid ($H_3PO_4$)
  10.0 g/L (providing 7.2 g/L of $PO_4^{3-}$ ions)
sodium pyrophosphate ($Na_4P_2O_7.10H_2O$)
  1.0 g/L (providing 0.4 g/L of $P_2O_7^{4-}$ ions)
phosphorous acid ($H_3PO_3$)
  2.0 g/L (providing 1.9 g/L of $PO_3^{3-}$ ions)
resin solids
  2.0 g/L of water soluble resin 3
pH = 6.0 (adjusted with sodium hydroxide)

Water soluble resin 3 had an average value for n in the general formula of 70, half of the X's and Y's in the general formula were Z, and Z was $—CH_2N(CH_3)_2$. Water soluble resin 3 was synthesized as for water soluble resin 1 but from 60 g of poly-4-vinylphenol, 23 g of dimethylamine, and 40 g of 37% formaldehyde solution.

Example 8

Tin-plated DI can was cleaned using the same conditions as in Example 1 and was then treated with a 30 second spray of surface treatment liquid composition 8 heated to 40° C. This treatment was followed with a water rinse and drying using the same conditions as in Example 1. This treated can was subjected to an evaluation of the corrosion resistance, adherence, and slideability, and the stability of surface treatment liquid composition 8 was also evaluated.

Surface-Treatment Liquid Composition 8

75% phosphoric acid ($H_3PO_4$)
  10.0 g/L (providing 7.2 g/L of $PO_4^{3-}$ ions)
sodium pyrophosphate ($Na_4P_2O_7.10H_2O$)
  1.0 g/L (providing 0.4 g/L of $P_2O_7^{4-}$ ions)
hypophosphorous acid ($H_3PO_2$)
  2.0 g/L (providing 1.9 g/L of $PO_2^{3-}$ ions)
resin solids
  0.4 g/L of water soluble resin 4
pH = 5.0 (adjusted with sodium carbonate)

Water soluble resin 4 was the same as water soluble resin 1, except that the average value of n in the general formula was only 3. Water soluble resin 4 was synthesized as for water soluble resin 1, but from 60 g of poly 4-vinylphenol with an average molecular weight of 360, 40 g of 2-methylaminoethanol, and 40 g of 37% formaldehyde solution.

Comparison Example 1

Tin-plated DI can was cleaned using the same conditions as in Example 1 and was then treated with a 30 second spray of surface-treatment liquid composition 9 heated to 60° C. This treatment was followed with a water rinse and drying using the same conditions as in Example 1. This treated can was subjected to an evaluation of the corrosion resistance, adherence, and slideability, and the stability of surface-treatment liquid composition 9 was also evaluated.

Surface-Treatment Liquid Composition 9

75% phosphoric acid ($H_3PO_4$)
  10.0 g/L (providing 7.2 g/L of $PO_4^{3-}$ ions)
sodium pyrophosphate ($Na_4P_2O_7.10H_2O$)
  1.0 g/L (providing 0.4 g/L of $P_2O_7^{4-}$ ions)
resin solids
  0.4 g/L of water soluble resin 1 as in Example 1.
pH = 5.0 (adjusted with sodium carbonate)

Comparison Example 2

Tin-plated DI can was cleaned using the same conditions as in Example 1 and was then treated with a 30 second spray of surface treatment liquid composition 10 heated to 60° C. This treatment was followed with a water rinse and drying using the same conditions as in Example 1. This treated can was subjected to an evaluation of the corrosion resistance, adherence, and slideability, and the stability of surface-treatment liquid composition 10 was also evaluated.

Surface-Treatment Liquid Composition 10

75% phosphoric acid ($H_3PO_4$)
  20.0 g/L (providing 14.4 g/L of $PO_4^{3-}$ ions)
sodium pyrophosphate ($Na_4P_2O_7.10H_2O$)
  10 g/L (providing 0.4 g/L of $P_2O_7^{4-}$ ions)
phosphorous acid ($H_3PO_3$)
  0.1 g/L (providing 0.095 g/L of $PO_3^{3-}$ ions)
resin solids
  8.0 g/L of water soluble resin 1 as in Example 1
pH = 4.0 (adjusted with sodium hydroxide)

Comparison Example 3

Tin-plated DI can was cleaned using the same conditions as in Example 1 and was then treated with a 30 second spray of surface treatment liquid composition 11 heated to 60° C. This treatment was followed with a water rinse and drying using the same conditions as in Example 1. This treated can was subjected to an evaluation of the corrosion resistance, adherence, and slideability, and the stability of surface-treatment liquid composition 11 was also evaluated.

Surface-Treatment Liquid Composition 11

75% phosphoric acid ($H_3PO_4$)
  10.0 g/L (providing 7.2 g/L of $PO_4^{3-}$ ions)
resin solids
  2.0 g/L of water soluble resin 1 as in Example 1
pH = 4.0 (adjusted with sodium carbonate)

Comparison Example 4

Tin-plated DI can was cleaned using the same conditions as in Example 1 and was then treated with a 30 second spray of surface treatment liquid composition 12 heated to 60° C. This treatment was followed with a water rinse and drying using the same conditions as in Example 1. This treated can was subjected to an evaluation of the corrosion resistance, adherence, and slideability, and the stability of surface treatment liquid composition 12 was also evaluated.

Surface-treatment Liquid composition 12

75% phosphoric acid ($H_3PO_4$)
  1.0 g/L (providing 0.72 g/L of $PO_4^{3-}$ ions)
resin solids
  2.0 g/L of water soluble resin 1 as in Example 1
pH = 7.0 (adjusted with sodium hydroxide)

Comparison Example 5

Tin-plated DI can was cleaned using the same conditions as in Example 1 and was then treated with a 30 second spray of surface treatment liquid composition 13 heated to 60° C. This treatment was followed with a water rinse and drying using the same conditions as in Example 1. This treated can was subjected to an evaluation of the corrosion resistance, adherence, and slideability, and the stability of surface-treatment liquid composition 13 was also evaluated.

Surface-Treatment Liquid Composition 13

75% phosphoric acid (H3PO4)
  10.0 g/L (providing 7.2 g/L of $PO_4^{3-}$ ions)
sodium pyrophosphate (Na4P2O7.10H2O)
  1.0 g/L (providing 0.4 g/L of $P_2O_7^{4-}$ ions)
resin solids
  0.05 g/L of water soluble resin 1 as in Example 1
pH=4.0 (adjusted with sodium carbonate)

Comparison Example 6

Tin-plated DI can was cleaned using the same conditions as in Example 1 and was then treated with a 30 second spray of surface treatment liquid composition 14 heated to 60° C. This treatment was followed with a water rinse and drying using the same conditions as in Example 1. This treated can was subjected to an evaluation of the corrosion resistance, adherence, and slideability, and the stability of surface treatment liquid composition 14 was also evaluated.

Surface-Treatment Liquid Composition 14

75% phosphoric acid (H3PO4)
  1.0 g/L (providing 0.72 g/L of $PO_4^{3-}$ ions)
sodium pyrophosphate (Na4P2O7.10H2O)
  1.0 g/L (providing 0.4 g.L of $P_2O_7^{4-}$ ions)
resin solids
  2.0 g/L of water soluble resin 5
pH=4.0 (adjusted with sodium hydroxide)
Water-soluble resin 4 had the chemical formula:

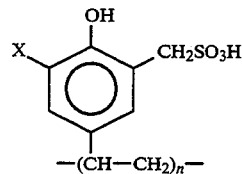

The average value of n was about 40.

Water-soluble resin 4 was synthesized as follows: 50 g of poly{4-vinylphenol} (molecular weight=about 5,000) was placed in a 1,000 mL reaction flask equipped with a condenser, nitrogen inlet tube, overhead stirrer, and thermometer, and 500 g of 1,4-dioxane was added for dissolution. An amount of 80 g of liquid sulfur trioxide (SO3) was added over a time of 1 hour while the mixture was maintained at around 10° C. This was followed by heating to 80° C. and reaction for 4 hours while stirring. Neutralization was carried out with 10% sodium hydroxide solution and the solvent was distilled off.

The various results are reported in Table 1, and they confirm that the surface treatment liquid compositions according to the present invention have excellent stability and also forms a film having an excellent corrosion resistance, adherence, and slideability.

TABLE 1

| | TEST RESULTS | | | |
|---|---|---|---|---|
| | IEV | Peel Strength, kgf/5 mm-width | Friction Coefficient | Stability |
| Example 1 | 40 | 2.0 | 0.8 | + |
| Example 2 | 40 | 2.0 | 0.8 | + |
| Example 3 | 50 | 2.0 | 0.8 | + |
| Example 4 | 40 | 2.0 | 0.8 | + |
| Example 5 | 40 | 2.0 | 0.8 | + |
| Example 6 | 60 | 2.0 | 0.8 | + |
| Example 7 | 40 | 2.0 | 0.8 | + |
| Example 8 | 60 | 2.0 | 0.8 | + |
| Comparison Example 1 | 40 | 2.0 | 0.8 | x |
| Comparison Example 2 | 50 | 2.0 | 0.8 | x |
| Comparison Example 3 | 250 | 1.5 | 1.0 | x |
| Comparison Example 4 | 950 | 1.3 | 1.0 | x |
| Comparison Example 5 | 500 | 1.5 | 1.0 | x |
| Comparison Example 6 | 750 | 1.3 | 1.0 | x |

Notes for Table 1
+ = no precipitation
x = precipitation

The invention claimed is:

1. An aqueous liquid composition of matter having a pH in the range from 2.0 to 6.5 and comprising water and:
   (A) from 1 to 30 g/L of phosphate ions,
   (B) from 0.1 to 5 g/L of condensed phosphate ions,
   (C) from 0.5 to 5 g/L of reducing agent, and
   (D) from 0.1 to 20 g/L of dissolved solids of a water soluble resin component selected from molecules conforming to the following general formula:

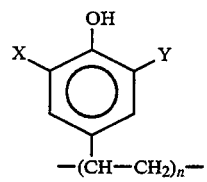

where, in the preceding formula, n is an integer with a value in the range from 2 to 80; each of X and Y independently of each other and independently for each of the n units in the molecule may represent hydrogen or a group "Z" with the following general formula:

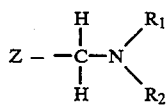

in which each of R1 and R2 independently of each other and independently for each Z group in the component represents a C1 to C10 alkyl or hydroxyalkyl moiety, except that the total number of Z groups present in the resin component is from 30 to 200% of the total number of aromatic rings in the resin component.

2. A liquid composition according to claim 1, wherein the groups Z in the general formula have one of the following formulas:

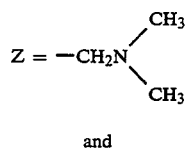

and

-continued

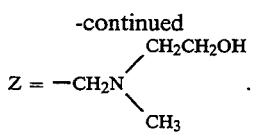

3. A liquid composition according to claim 2, wherein the condensed phosphate ions are selected from the group consisting of pyrophosphate ions, tripolyphosphate ions, tetrapolyphosphate ions, and mixtures thereof.

4. A liquid composition according to claim 1, wherein the condensed phosphate ions are selected from the group consisting of pyrophosphate ions, tripolyphosphate ions, tetrapolyphosphate ions, and mixtures thereof.

5. A liquid composition according to claim 4, wherein the reducing agent component is selected from the group consisting of phosphorous acid, hypophosphorous acid, salts of phosphorous and hypophosphorous acids, and mixtures of any two or more of phosphorous and hypophosphorous acids and salts of phosphorous and hypophosphorous acids.

6. A liquid composition according to claim 3, wherein the reducing agent component is selected from the group consisting of phosphorous acid, hypophosphorous acid, salts of phosphorous and hypophosphorous acids and mixtures of any two or more of phosphorous and hypophosphorous acids and salts of phosphorous and hypophosphorous acids.

7. A liquid composition according to claim 2, wherein the reducing agent component is selected from the group consisting of phosphorous acid, hypophosphorous acid, salts of phosphorous and hypophosphorous acids and mixtures of any two or more of phosphorous and hypophosphorous acids and salts of phosphorous and hypophosphorous acids.

8. A liquid composition according to claim 1, wherein the reducing agent component is selected from the group consisting of phosphorous acid, hypophosphorous acid, salts of phosphorous and hypophosphorous acids and mixtures of any two or more of phosphorous and hypophosphorous acids and salts of phosphorous and hypophosphorous acids.

9. A liquid composition according to claim 8, wherein the amount of component (A) is in the range from 5 to 15 g/L, the amount of component (B) is in the range from 0.4 to 1 g/L, and the amount of component (C) is in the range from 1 to 3 g/L.

10. A liquid composition according to claim 7, wherein the amount of component (A) is in the range from 5 to 15 g/L, the amount of component (B) is in the range from 0.4 to 1 g/L, and the amount of component (C) is in the range from 1 to 3 g/L.

11. A liquid composition according to claim 6, wherein the amount of component (A) is in the range from 5 to 15 g/L, the amount of component (B) is in the range from 0.4 to 1 g/L, and the amount of component (C) is in the range from 1 to 3 g/L.

12. A liquid composition according to claim 5, wherein the amount of component (A) is in the range from 5 to 15 g/L, the amount of component (B) is in the range from 0.4 to 1 g/L, and the amount of component (C) is in the range from 1 to 3 g/L.

13. A liquid composition according to claim 4, wherein the amount of component (A) is in the range from 5 to 15 g/L, the amount of component (B) is in the range from 0.4 to 1 g/L, and the amount of component (C) is in the range from 1 to 3 g/L.

14. A liquid composition according to claim 3, wherein the amount of component (A) is in the range from 5 to 15 g/L, the amount of component (B) is in the range from 0.4 to 1 g/L, and the amount of component (C) is in the range from 1 to 3 g/L.

15. A liquid composition according to claim 2, wherein the amount of component (A) is in the range from 5 to 15 g/L, the amount of component (B) is in the range from 0.4 to 1 g/L, and the amount of component (C) is in the range from 1 to 3 g/L.

16. A liquid composition according to claim 1, wherein the amount of component (A) is in the range from 5 to 15 g/L, the amount of component (B) is in the range from 0.4 to 1 g/L, and the amount of component (C) is in the range from 1 to 3 g/L.

17. A process for treating a tin plated steel surface by contacting the surface for a time from 2 to 60 seconds with a composition according to claim 1 at a temperature in the range from 20° to 80° C.

18. A process according to claim 17, where the temperature is in the range from 40° to 60° C.

19. A process for treating a tin plated steel surface by contacting the surface for a time from 2 to 60 seconds with a composition according to claim 12 at a temperature in the range from 40° to 60° C.

20. A process for treating a tin plated steel surface by contacting the surface for a time from 2 to 60 seconds with a composition according to claim 2 at a temperature in the range from 20° to 80° C.

* * * * *